No. 11,774. Reissued Sept. 19, 1899.

E. A. THIEM.

TOE CLIP FOR BICYCLES.

(Application filed July 22, 1898.)

Witnesses;
C. E. Van Dorn.
A. F. Holmes

Inventor;
Edward A. Thiem.
By Paul & Hawley
his attorneys.

UNITED STATES PATENT OFFICE.

EDWARD A. THIEM, OF ST. PAUL, MINNESOTA, ASSIGNOR OF ONE-HALF TO GEORGE W. WEBER, OF SAME PLACE.

TOE-CLIP FOR BICYCLES.

SPECIFICATION forming part of Reissued Letters Patent No. 11,774, dated September 19, 1899.

Original No. 574,286, dated December 29, 1896. Application for reissue filed July 22, 1898. Serial No. 686,626.

*To all whom it may concern:*

Be it known that I, EDWARD A. THIEM, a citizen of the United States, residing at St. Paul, in the county of Ramsey and State of Minnesota, have made certain new and useful Improvements in Toe-Clips for Bicycles, of which the following is a specification.

My invention relates to improvements in bicycle toe-clips, its object being to provide a clip which will embrace the foot, so as to hold it to the pedal, and which will also furnish a continuous support over the foot, so as to withstand the strain of a sudden stop or the hard pull in coming up steep grades, where it is desired to pull up on the pedals.

To this end my clip is made up of a toe-receiving bend and a foot-embracing loop, said loop and bend being intertwisted or interlocked upon the top of the foot and the foot-embracing loop being preferably formed with reverse rearwardly-extending bends adapted to furnish a support for the instep. The ends of the foot-loop are preferably slidably interlocked beneath the foot, so as to be secured in adjusted positions to the pedal. The end of the toe-holding bend also passes underneath the foot and is adjustably connected to the interlocked ends of the foot-embracing loop. I am thus able to adjust both the width and height of the clip so as to fit it to any size or shape of shoe. With the clip adjusted to fit the shoe of the rider a firm continuous support is furnished entirely around the foot, there being no parts which can be separated by the strain of an upward pull. The rider can thus pull up on one pedal while pushing down upon the other, thereby greatly increasing the driving power.

My invention further consists in the construction hereinafter more particularly described and claimed.

In the accompanying drawings, forming part of this specification, Figure 1 is a perspective view of one of the ordinary pedals of a bicycle. Fig. 2 is a similar view of my improved toe-clip. Fig. 3 is a view of a portion of the clip, illustrating a modification in the manner of connecting the foot-embracing loop and toe-holding bend; and Figs. 4 and 5 are details of the lower portion of a modified form of clip in which the same is attached to the pedal without means for lateral adjustment of the foot-embracing loop.

In the drawings, A represents the ordinary bicycle-pedal, to the side bar 2 of which is adapted to be secured my improved toe-clip B. This clip is made up of the foot-embracing loop 3 and the toe-holding bend 4, preferably formed of a single piece of wire intertwisted or interlocked together at 5 for the purpose more fully hereinafter described. The foot-embracing loop is formed upon each side of its connection with the toe-holding bend 4, with rearwardly-projecting bends 6. These bends bear upon the instep of the foot and furnish a better lifting support.

The ends of the wire constituting the foot-embracing loop are each formed with an eye 7, encircling the opposite member, thus permitting the loop to be adjusted to fit different-sized shoes. The bend 4 extends around the toe and underneath the foot, its end 8 being downturned adjacent the interlocking ends of the foot-loop.

For securing the clip to the pedal I provide the clamp-plate 9, which is fitted over the interlocked ends of the foot-embracing loop and is provided with an opening 10, through which the securing-bolt 11 is passed, the bolt projecting through the opening 12 in the side of the pedal and being secured by a nut 13.

The end 8 of the bend 4 may be raised or lowered to vary the height of the clip and the sides of the foot-embracing loop separated or closed to vary its width, the parts being held in such adjusted positions by means of the connection with the pedal.

Figure 2:
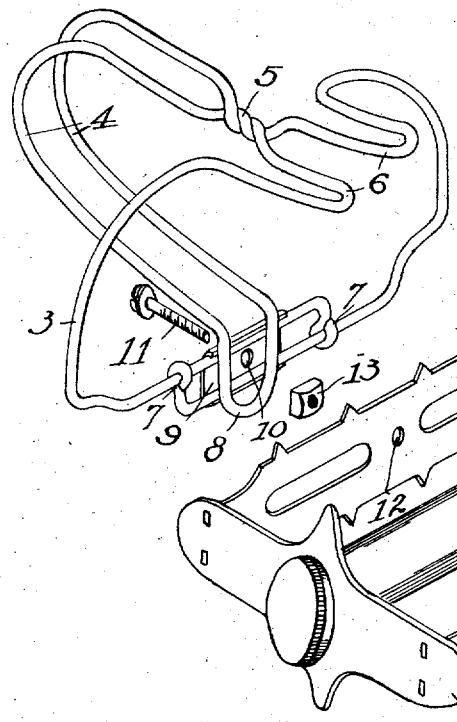
Figure 1:
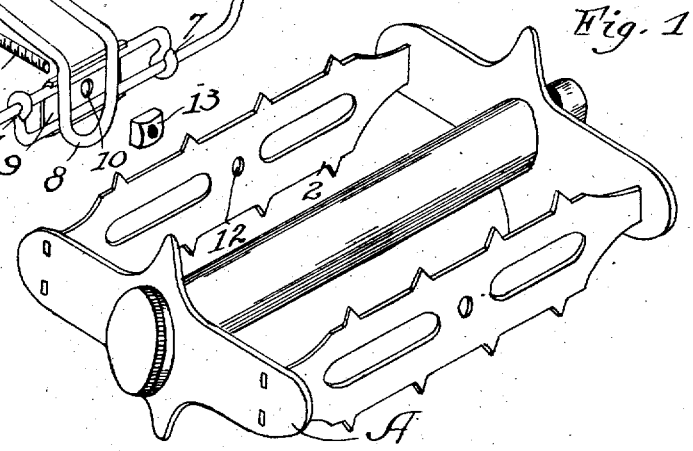
Figure 4:
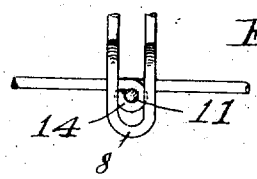
Figs. 4 and 5 illustrate my toe-clip with the ends of the foot-embracing loop formed with eyes 14 to receive the securing-bolt instead of being adjustably connected, as shown in Fig. 2. Otherwise the construction of the clip is the same as my preferred construction.
Figure 3:
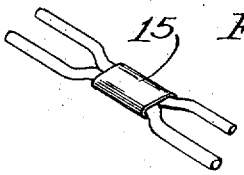
Fig. 3 illustrates a modified form of connection between the toe-holding bend and foot-embracing loops. In this form the parts are secured together by means of a sheet-metal clamp or sleeve 15 instead of being intertwisted, as shown in Fig. 2.
Figure 5:
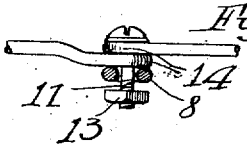

In both forms of my clip I firmly intertwist or interlock the foot-embracing loop and toe-receiving bend, thus securing a continuous stirrup-like support around the foot for the purposes above described and which will not separate under strain. This is the important feature of my invention. In those clips which have guards the side guards either do not extend up over the foot or else they are not connected at the top, and thus become separated by the hard lifting strain.

In my toe-clip the adjustable side guards or foot-embracing loop and the toe-receiving bend both constitute features of the toe-clip, and hence may be found in a unitary structure.

Having thus described my invention, what I claim as new is—

1. A toe-clip for bicycles formed of a single piece of wire comprising a foot-holding section and a toe-embracing section with the ends of the wire underlapping beneath the ball of the foot and having eyes upon the ends embracing the adjacent underlapping sections, and means for coupling said clip to a pedal to permit the lateral adjustment of the adjacent underlapping sections, to vary the width of the clip, substantially as and for the purpose set forth.

2. As an improved article of manufacture, a toe-clip of the class described, comprising a toe-holding bend and a foot-embracing loop connected thereto upon the top of the foot, said foot-embracing loop having its ends adjustably connected underneath the foot to accommodate shoes of varying widths.

3. As an improved article of manufacture, a toe-clip of the class described, consisting of a toe-receiving bend, adjustable side guards, and means for securing the side guards at any desired width.

4. As an improved article of manufacture, a bicycle-pedal clip, comprising a toe-holding bend, a continuous foot-embracing loop connected thereto, and means for adjusting both the lateral and vertical dimensions of said clip, and securing the same in adjusted positions to the pedal.

5. As an improved article of manufacture, a bicycle-pedal toe-clip, consisting of a foot-embracing loop, with the ends slidably connected underneath the foot, to permit of their relatively lateral adjustment, the toe-holding bend rigidly connected to the top of said foot-loop, and engaging the interlocked ends of said first-named loop underneath the foot, and the clamp for securing the ends of said loop and bend in adjusted positions to the pedal.

6. As an improved article of manufacture, a bicycle-pedal toe-clip, consisting of a single piece of wire forming the foot-embracing loop, and a toe-receiving bend rigidly connected thereto on the top of the foot, and with their ends adjustably interlocked beneath the foot and means for securing them in adjusted positions upon the pedal.

7. A toe-clip for bicycle-pedals, consisting of the toe-receiving bend, the adjustable side guards, and the bolt for securing the side guards at any desired width and attaching the clip to the pedal.

8. The combination, with the bicycle-pedal, of a toe-clip consisting of the U-shaped portion for the toe, the loop below, and the loops above said portion, the side guards, and the clamping-bolt for securing the side guards at any desired width.

9. A toe-clip for bicycles, comprising a foot-embracing loop having rearwardly-extending bends at its top, and a toe-receiving bend joining and interlocked with the rearwardly-extending bends of said foot-embracing loop, and means for attaching the lower parts of said foot-receiving loop and toe-receiving bend to the forward plate of a bicycle-pedal.

10. A toe-clip for bicycles, comprising a foot-embracing loop adapted to be secured to the pedal in substantial alinement with the forward pedal-plate and provided with rearwardly-projecting bends formed integrally with said loop, and a forwardly-projecting toe-receiving bend interlocked with said foot-embracing loop at the upper part thereof, for the purpose set forth.

11. A toe-clip for bicycles, formed of a single piece of wire, comprising a foot-embracing loop provided with rearwardly-projecting bends at the top of said loop, and a forwardly-projecting toe-receiving bend intertwisted with said foot-embracing loop at the top of said loop, and means for securing said clip to a front pedal-plate, for the purpose set forth.

12. A toe-clip for bicycles, comprising the foot-embracing loop 3 and the toe-holding bend 4 formed of a single piece of wire intertwisted or interlocked together at 5, said foot-embracing loop being provided upon each side of its connection with the toe-holding bend 4 with the rearwardly-projecting bend 6 adapted to bear upon the instep of the foot, and means for securing the said clip to a front pedal-plate, for the purpose set forth.

13. As an improved article of manufacture, a toe-clip of the class described, comprising a foot-embracing loop secured to the pedal in substantial alinement with the forward pedal-plate and provided at its upper portion with rearwardly-extending bends, and a forwardly-projecting toe-receiving bend joining and interlocked with the rearwardly-extending bends of said foot-embracing loop, whereby, as the foot is in position upon the pedal, with the toe of the shoe projecting into the toe-loop, and the ball of the foot standing between the front and rear of the pedal, the rearwardly-extending bends of the foot-embracing loop will bear upon the top of the foot in a vertical plane with the front pedal-plate so as to furnish a support at that point in the upward pull of the foot.

EDWARD A. THIEM.

Witnesses:
A. C. PAUL,
A. F. HOLMES.